United States Patent [19]

Soled et al.

[11] Patent Number: 5,397,806
[45] Date of Patent: Mar. 14, 1995

[54] METHOD FOR STABILIZING TITANIA SUPPORTED COBALT CATALYST (C-2715)

[75] Inventors: Stuart L. Soled, Pittstown; Enrique Iglesia, Clinton; Rocco A. Fiato, Basking Ridge; Gerald B. Ansell, Flemington, all of N.J.

[73] Assignee: Exxon Research & Engineering Co., Florham Park, N.J.

[21] Appl. No.: 148,749

[22] Filed: Nov. 5, 1993

Related U.S. Application Data

[60] Division of Ser. No. 987,031, Dec. 7, 1992, abandoned, which is a continuation-in-part of Ser. No. 791,730, Nov. 14, 1991, Pat. No. 5,169,821.

[51] Int. Cl.⁶ ............................................. C07C 1/04
[52] U.S. Cl. ................................................... 518/715
[58] Field of Search ........................................ 518/715

[56] References Cited

U.S. PATENT DOCUMENTS

| | | |
|---|---|---|
| 4,542,122 | 9/1985 | Payne et al. . |
| 4,647,592 | 3/1987 | Mauldin . |
| 4,670,475 | 6/1987 | Mauldin . |
| 4,794,099 | 12/1988 | Iglesia et al. . |
| 4,822,824 | 4/1989 | Iglesia et al. . |
| 4,992,406 | 2/1991 | Mauldin et al. ..................... 502/304 |

OTHER PUBLICATIONS

T. A. Egerton, et al., "XPS Analysis of Uncoated and Silica-Coated Titanium Dioxide Powers," 1983, pp. 311-323, Colloids and Surfaces, vol. 7.

Hideshi Hattori, et al., "The Nature of Active Sites on TiO₂ and TiO₂-SiO₂ for the Isomerization of Butenes," 1975, pp. 172-178, Journal Catalysis, vol. 38.

D. N. Furlong, et al., "The Precipitation of Silica on Titanium Dioxide Surfaces," May 1979, pp. 409-419, Journal of Colloid and Interface Science, vol. 69.

*Primary Examiner*—Howard T. Mars
*Attorney, Agent, or Firm*—Estelle Bakun

[57] ABSTRACT

A method of preparing catalyst compositions of cobalt composited with ternary metal oxide supports of substituted titania having the general formula Co/-Ti$_{1-x}$M$_x$O$_2$ where x ranges from 0.01 to 0.14 and M is selected from the group consisting of silicon, zirconium, and tantalum and wherein the titania is an anatase polymorph stable under oxidative regeneration temperatures from about 400° to about 750° C.

1 Claim, 1 Drawing Sheet

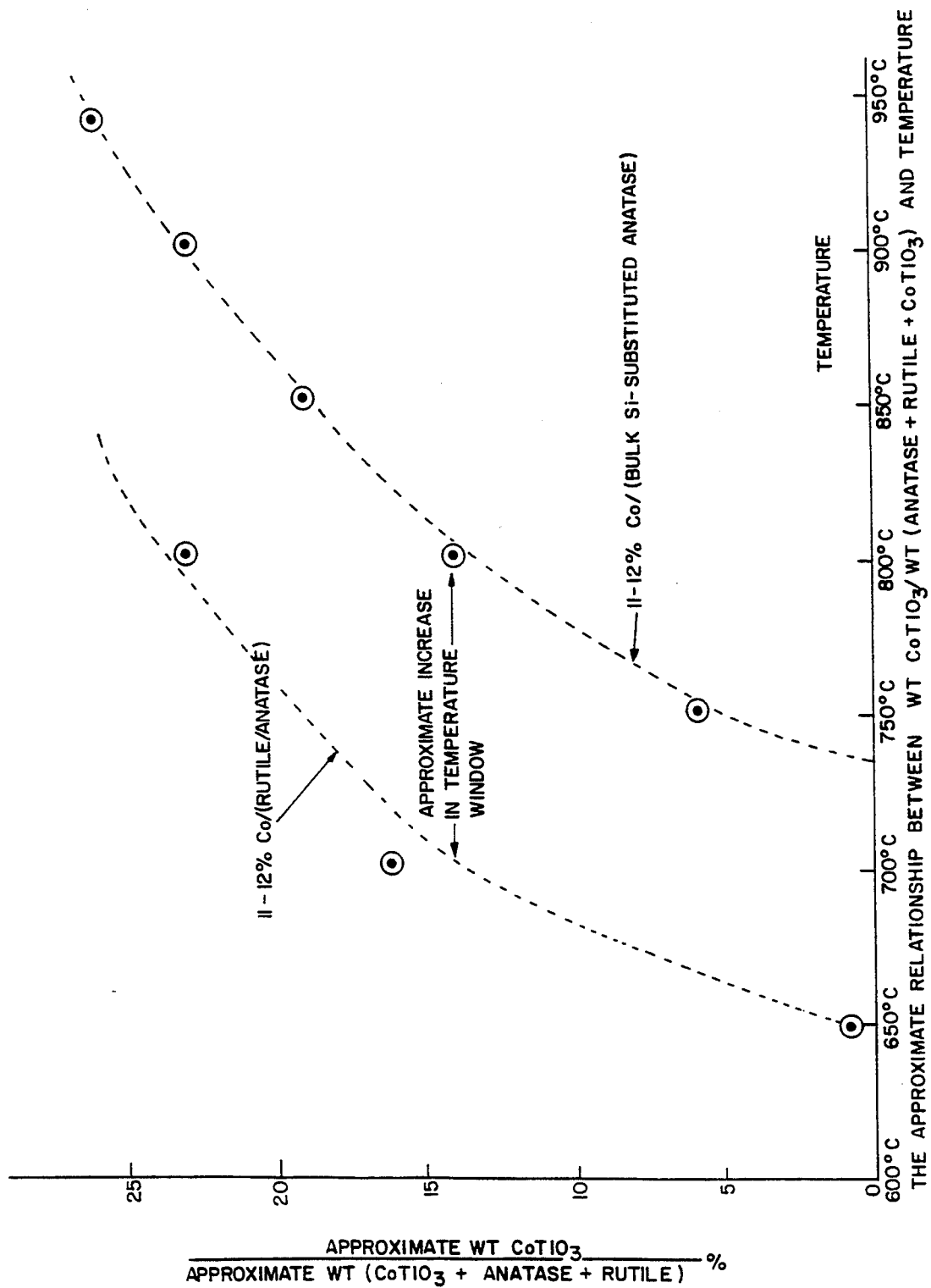

METHOD FOR STABILIZING TITANIA SUPPORTED COBALT CATALYST (C-2715)

This is a division of application Ser. No. 987,031, filed Dec. 7, 1992, now abandoned, which is a continuation-in-part of application Ser. No. 791,730, filed Nov. 14, 1991, and now U.S. Pat. No. 5,169,821.

BACKGROUND OF THE INVENTION

1. Field of the Invention

The invention relates to supported cobalt catalysts used in Fischer Tropsch hydrocarbon synthesis. More specifically, the invention is directed to titania supported cobalt catalysts and their stabilization.

2. Background of the Disclosure

Coprecipitated titania supports are described in "Benzene Hydrogenation Over Ni/TiO2-ZrO2 Catalyst," Ikai Wang, et al., Appl. Cat., Vol. 18, p. 273-283, (1985) and "Dehydrogenation of Ethylbenzene and Ethylcyclohexane Over Mixed Ternary Oxide Catalyst Containing TiO2-ZrO2, " Jung-Chung Wu et al., Appl. Cat., Vol. 18, p. 295-310, (1985). In the former reference, nickel oxide is placed on mixed titania-zirconia oxides, binary oxides, which are then calcined at 90°-500° C. and reduced at 300° C. to form a dehydrogenation catalyst. None of the catalysts are subjected to high temperature oxidative regeneration nor used in a Fischer-Tropsch synthesis reaction. In the latter reference, three component mixed oxides containing titania and zirconia as two of the components, were tested as dehydrogenation catalysts. These catalysts, which did not contain metal, were examined by x-ray diffraction following calcination at 650° C. The authors indicate that most of the catalysts showed the presence of TiO2 rutile at this temperature; not a stabilized anatase phase. Ternary metal oxides are represented by the general formula $A_xB_yO_z$ and are distinguishable from three component metal oxides which have a formula of $AO_x$-$BO_y$$CO_z$.

Consequently, the prior art does not provide for cobalt containing catalysts that can be calcined on a titania-containing support to high temperature (up to 750° C.) in which the surface area of the support is maintained and the anatase to rutile transformation prevented, in turn preventing the cobalt from reacting with the support to form cobalt titanate, thereby helping maintain a high dispersion of cobalt following a low temperature rereduction.

SUMMARY OF THE INVENTION

The invention is a method of preparing catalyst compositions of cobalt composited with ternary metal oxide supports of substituted titania having the general formula $Co/Ti_{1-x}M_xO_2$ where x ranges from 0.01 to 0.14 and M is selected from the group consisting of silicon, zirconium, and tantalum and wherein the titania is an anatase polymorph stable under oxidative regeneration temperatures of from about 400° to about 750° C. The phrase "ternary metal oxides" has been used in the prior art to describe oxides such as spinels, perovskites, scheelites etc. that contain more than one cation. Therefore, $Ti_{1-x}M_xO_2$ where M=Si, Zr, or Ta, and having an anatase or rutile structure, is defined here as a ternary metal oxide (as defined in 0. Muller and R. Roy, The Major Ternary Structural Families, Springer-Verlag 1974 pg. 1, oxides with only one cation are defined as binary oxides).

The method comprises (a) contacting a titanium alkoxide or titanium chloride, such as titanium tetrachloride, with a metal alkoxide or metal chloride respectively, to form a solution; (b) adding water to the mixture of alkoxides or an aqueous base to the mixture of chlorides to form a coprecipitate; (c) separating the coprecipitate; (d) calcining (400°-750° C.) the dried coprecipitate to form a ternary metal oxide; (e) depositing a cobalt metal compound solution onto the surface of the ternary metal oxide to form a composite; and (f) activating the composite to form a catalyst composition of cobalt composited on a ternary metal oxide of titania having the general formula $Co/Ti_{1-x}M_xO_2$. Activating as used herein means drying and calcining (400°-600° C.) the composite followed by reduction of the cobalt.

BRIEF DESCRIPTION OF THE DRAWINGS

FIG. 1 shows the relationship between cobalt titanate (CoTiO3) formation and the transition of titania from the anatase to rutile polymorph as a function of temperature.

DETAILED DESCRIPTION

Titania has several crystalline structures, herein described as polymorphs. Anatase and rutile polymorphs are the most common and are readily formed from solution precipitation and calcination of many titanium precursors such as titanium chlorides, titanium alkoxides, etc.

Transformation of the anatase polymorph to the rutile polymorph occurs naturally at elevated temperatures and is accompanied by volume contraction and surface area reduction. The anatase polymorph has a cubic close packed structure while the rutile polymorph shows a hexagonal close packed structure. The futile polymorph is thermodynamically stable, with a denser, more efficiently packed structure. The cubic close packing arrangement of the anatase polymorph is extremely distorted.

As certain cations are substituted into the anatase structure, the anatase to futile transformation is retarded and the transition temperature increases. The mechanism of bulk cation substitution that stabilizes the anatase polymorph is not clear. Probably, substituting a more polarizable metal cation, able to accept the larger distortions of the anatase polymorph, stabilizes the anatase polymorph, whereas substituting such cations destabilizes the rutile polymorph. The net result is that certain substitutions cause the anatase to futile polymorph transformation to occur at higher temperatures.

Metal cations which inhibit the transformation to the rutile polymorph, in accordance with the present invention, include silicon, zirconium, and tantalum; preferably silicon and zirconium; more preferably silicon. Certain metal cations, such as copper, are deemed undesirable and fall outside the scope of this invention because they accelerate transformation of the anatase to the rutile polymorph.

In addition to exhibiting an inhibiting effect to transformation into the futile polymorph, the surface area of the titania support must also be capable of avoiding collapse during cobalt reduction or subsequent high temperature regeneration. Surface area collapse is prevented by substitution of $ZrO_2$, $Ta_2O_5$, and $SiO_2$ into $TiO_2$ (anatase).

In the case of the unsubstituted anatase polymorph, which contains cobalt oxide on the surface, $CoTiO_3$ forms readily during the high temperature oxidative regeneration. Formation of $CoTiO_3$ traps cobalt in a difficult to reduce form. This necessitates high temperature reduction to reduce the $CoTiO_3$ resulting in a loss of cobalt's specific surface area. FIG. 1 shows $CoTiO_3$ is clearly formed at 700° C., along with a mixture of both the anatase and rutile phases of TiO2. Loss of cobalt's specific surface area results in lower dispersion of the cobalt and hence lower catalyst activity.

In virtually any catalytic process, catalyst activity decreases as run length increases due to a variety of factors: deposition of coke or carbon on the catalyst as a result of cracking, hydrogenolysis, or polymerization, buildup of poisons in the feed, such as sulfur or nitrogen compounds, etc. In hydrocarbon synthesis reactions carbon tends to build up or grow (by complex polymerization mechanisms) on the surface of the catalyst, thereby shielding the catalytic metals from the reactants. Activity decreases, and at some pre-set level of activity (as defined by conversion, selectivity or both), the process becomes sufficiently uneconomical to continue and the catalyst is either replaced or regenerated.

In order to remove the carbon and reactivate the catalyst, the coke or hydrocarbon residue must be removed. This can be accomplished by oxidative treatment at high temperatures followed by rereduction of the catalyst. Rereduction is responsible for converting cobalt back to cobalt metal. The rereduction should occur at as low a temperature as the initial catalyst reduction to avoid sintering of the cobalt metal.

Unlike many catalysts commonly used by the refining industry, when coke deposits are burned from cobalt-titania catalysts at oxidizing conditions by contact with an oxygen-containing gas such as air, at elevated temperatures, and the catalyst thereafter treated with hydrogen to reduce the cobalt metal component, the initially high activity of cobalt-titania catalysts does not return. Rather their activity is considerably less than that of a fresh cobalt-titania catalyst. Moreover, after the regeneration and reactivation of the catalysts, there is no improvement in the rate of deactivation, and the deactivation proceeds from a lower initial activity. This loss in the overall activity brought about by burning the coke from these catalysts at elevated temperatures in the presence of an oxygen containing gas, such as air, is not only detrimental per se, but severely restricts the overall life of the catalyst and threatens their full utilization in commercial operations.

The substitution of Si, Ta, and Zr cations into the anatase structure of the catalyst of the present invention likely retards the formation of $CoTiO_3$, preventing the entrapment of cobalt and preserving its specific surface area.

In accordance with the present invention, the titanium alkoxide may be selected from the following: titanium butoxide, titanium ethoxide, titanium isobutoxide, titanium isopropoxide, titanium methoxide or titanium n-propoxide, and mixtures thereof.

The metal alkoxide may be selected from tetramethylorthosilicate, tetraethylorthosilicate, tetrapropylorthosilicate, tetrabutylorthosilicate, zirconium ethoxide, zirconium n-propoxide, tantalum ethoxide, or tantalum methoxide, and mixtures thereof.

Alternatively, titanium chloride may be used and mixed with the desired metal chloride. The metal chloride may be selected from silicon tetrachloride, zirconium dichloride oxide, zirconium tetrachloride, or tantalum pentachloride, and mixtures thereof.

In general, the nature of the titanium alkoxides must be such that they are soluble in organic solvents such as methanol, ethanol, propanol, n-butanol, isobutanol, acetaldehyde, acetone, methyl ethyl ketone or diethyl ether. The titanium chlorides may be soluble in either aqueous solvents or mixtures of aqueous and organic solvents. Solubility in aqueous solvents is preferred. Solvents are added when dealing with solid reactants, but are unnecessary when the reactants are liquids. The titanium alkoxides and chlorides must also allow the coprecipitate to form either by hydrolysis or pH adjustment. Hydrolysis is employed for the alkoxide mixtures whereas pH adjustment is employed for the aqueous chloride mixtures. During the contacting step and at all times thereafter in the process ambient temperature and pressure are maintained unless otherwise noted.

When simple hydrolysis is sufficient to form the coprecipitate, water is contacted with the titanium and metal alkoxide for a time sufficient to form the coprecipitate. Generally the coprecipitate forms immediately upon contact with water but may take from about 1–300 minutes. Alternatively, for the aqueous solution, dilute (1N) ammonium hydroxide is used to raise the pH of the titanium and metal chloride solution to the region of 7.1 to 10 in order to form the coprecipitate. Other suitable bases are, for example, ammonium carbonate, or bicarbonate.

The coprecipitate is then separated from the solution by employing any conventional means for example, centrifuging, filtering, or decanting. Once separated, the coprecipitate is then washed with water or an organic solvent. Preferred solvents include acetone, diethylether, methanol or ethanol. The coprecipitate is then dried (80°–120° C.) and calcined (400°–750° C).

The TiO2 anatase samples of the examples were prepared by hydrolysis of titanium tert-butoxide (H2O: Ti 4:1) at 20°–25° C., filtered, then washed thoroughly with distilled water and air dried overnight. The product was then calcined at temperatures up to 700° C. The substituted titanias isomorphous with anatase were obtained by mixing the desired metal alkoxides: tetramethylorthosilicate, tantalum ethoxide, zirconium n-propoxide with titanium tert-butoxide and then treating in a similar hydrolysis/calcination procedure.

After calcining, the coprecipitate forms a ternary metal oxide having the general formula $A_xB_yO_z$.

The cobalt metal can be deposited on a previously pilled, pelleted, beaded, extruded or sieved ternary metal oxide support by techniques known in the art for preparing impregnated catalyst. In preparing catalysts, the cobalt metal is deposited from solution onto the support in preselected amounts to provide the desired absolute amounts and weight ratios of the respective cobalt. Suitably, the ternary metal oxide support can be composited with a solution of a cobalt-containing compound. These compounds may be in the form of cobalt nitrates, carbonates, organometallics and inorganic compounds which decompose to give cobalt oxide upon calcination. Preferred cobalt-containing compounds include cobalt nitrate, cobalt acetate, cobalt oxalate, or cobalt sulfate; the most preferred is cobalt nitrate. The cobalt compound can be dissolved in water or in an appropriate organic solvent including methanol, acetone or ethanol.

The amount of impregnation solution used should be sufficient to completely fill the pore volume of the support. The impregnation step can be carried out under a wide range of conditions, known to those skilled in the art, including ambient or elevated temperatures.

Another method for impregnating the ternary metal oxide onto the cobalt is chemical vapor deposition (CVD). In CVD a vapor species of cobalt is contacted with the solid ternary oxide support, forming a dispersed metal species on the outer surface of the support.

The ternary metal oxide support contains titania that is in an anatase polymorph. The surface area of the anatase polymorph is preferably between about 30 and 300 m²/gm.

The catalyst, after impregnation, is dried by heating preferably between 80° C. and 120° C., in the presence of an inert gas, oxygen, both, or under vacuum.

Next, the cobalt is calcined in order to convert the cobalt precursor to cobalt oxide. Preferably, the catalyst is contacted with oxygen, air, or other oxygen containing gas at temperatures sufficient to effect the conversion, ranging from 400° C. to 750° C.

Drying, as used herein, is not to be confused with calcining. According to the invention drying is conducted at temperature ranging from 80° C. to 120° C. and is primarily aimed at removing any remaining solvent and free water from the surface of the material. Calcining, on the other hand, is conducted at higher temperatures ranging from 400° C. to 750° C., and is aimed at expelling the volatile substances from the material.

The cobalt and support are then reduced by contacting the catalyst with a reducing agent which is suitably hydrogen or a hydrogen-containing gas stream. The reduction is conducted at temperatures above about 250° C. to about 500° C.; preferably above about 300° C. to about 450° C. and for periods ranging from about 0.5 hours to about 24 hours from ambient to about 40 atmospheres.

In conducting synthesis gas reactions the total pressure upon the CO and $H_2$ reaction mixture is generally maintained above about 80 psig, and preferably above about 140 psig. It is generally desirable to employ carbon monoxide, and hydrogen, in molar ratio of $H_2$:CO above about 0.5:1 and preferably equal to or above about 1.7:1 to increase the concentration of $C_{10+}$ hydrocarbons in the product. Suitably, the $H_2$:CO molar ratio ranges from about 0.5:1 to about 4:1, and preferably the carbon monoxide and hydrogen are employed in molar ratio $H_2$:CO ranging from about 1.7:1 to about 2.5:1. In general, the reaction is carried out at gas hourly space velocities ranging from about 100 V/Hr/V to about 5000 V/Hr/V, preferably from about 300 V/Hr/V to about 1500 V/Hr/V, measured as standard volumes of the gaseous mixture of carbon monoxide and hydrogen (0° C., 1Atm.) per hour per volume of catalyst. The reaction is conducted at temperatures ranging from about 160° C. to about 290° C., preferably from about 190° C. to about 260° C. Pressures preferably range from about 80 psig to about 600 psig, more preferably from about 140 psig to about 400 psig. The product generally and preferably contains 60 percent, or greater, and more preferably 75 percent, or greater, $C_{10+}$ liquid hydrocarbons which boil above 160° C. (320° F.).

Having described the invention, the following are examples which illustrate the various workings of it. They are not intended to limit the invention in any way.

EXAMPLE 1

Unsubstituted Co/TiO$_2$ Catalyst—Anatase Polymorph

Titanium tert-butoxide (310 gms) was mixed with water (66 cc) at a mole ratio of $H_2$:Ti of 4:1 at a temperature of 20°–25° C. The precipitate formed was filtered, washed with distilled water, and air dried for approximately 12 hours. The resulting dried support was then calcined at temperatures of 430°–700° C.

For 10 grams of the support calcined at 430° C., cobalt (corresponding to 11% Co on TiO$_2$) was impregnated by dissolving 6.12 gm of cobalt nitrate hydrate in 7 cc of acetone. The impregnated support was then dried overnight at 100° C. and calcined between 430° C. and 700° C.

EXAMPLE 2

Co Supported on Silicon Substituted Titania Co/Ti$_{1-x}$Si$_x$O$_2$ Catalyst—Anatase Polymorph Substituted titanias, isomorphous with anatase, were obtained by following the hydrolysis procedure described in Example 1, except that the silicon alkoxide silicon tetramethylorthosilicate was added to the titanium alkoxide. The quantities are listed below:

| Support | Titanium tert-butoxide (gm) | Silicon tetramethyl-orthosilicate (gm) | H$_2$O (cc) |
|---|---|---|---|
| Ti$_{.99}$Si$_{.01}$O$_2$ | 524 | 2.4 | 112 |
| Ti$_{.97}$Si$_{.03}$O$_2$ | 513 | 7.1 | 112 |
| Ti$_{.95}$Si$_{.05}$O$_2$ | 503 | 12 | 112 |
| Ti$_{.86}$Si$_{.14}$O$_2$ | 455 | 33 | 112 |

The quantity of titanium tert-butoxide as indicated above is added to the tetramethylorthosilicate. To this solution the volume of water indicated above is added to hydrolyze the solution. After stirring for 30 minutes, the precipitate was filtered, washed thoroughly with warm water, and the substituted support was calcined in air to 430°–700° C.

To 10 grams of the Ti$_{0.86}$Si$_{0.14}$O$_2$ support, 11% cobalt was impregnated and calcined as described in Example 1.

EXAMPLE 3

Zirconium Substituted Titania Ti$_{1-x}$Zr$_x$O$_2$ Catalyst—Anatase Polymorph

Substituted titanias, isomorphous with anatase, were obtained by following the hydrolysis procedure described in Example 1, except that the zirconium alkoxide, zirconium n-propoxide, was added to the titanium alkoxide. The quantities are listed below:

| Support | Titanium tert-butoxide (gm) | Zirconium n-propoxide (gm) | H$_2$O (cc) |
|---|---|---|---|
| Ti$_{.97}$Zr$_{.03}$O$_2$ | 185 | 5.5 | 40 |
| Ti$_{.86}$Zr$_{.14}$O$_2$ | 164 | 26 | 40 |

The quantity of titanium tert-butoxide as indicated above is added to the zirconium n-propoxide. To this solution the volume of water indicated above is added to hydrolyze the solution. After stirring for 30 minutes, the precipitate was filtered, washed thoroughly with warm water and the substituted support was calcined in air to 700° C.

EXAMPLE 4

Tantalum Substituted Titania $Ti_{0.86}Ta_{0.14}O_2$ Anatase Polymorph

Substituted titanias, isomorphous with anatase, were obtained by following the hydrolysis procedure described in Example 1, except that the tantalum alkoxide, tantalum ethoxide, was added to the titanium alkoxide. 164 grams of titanium tert-butoxide is mixed together with 40 grams of tantalum ethoxide and stirred. To this 33 cc of water is added to hydrolyze the solution. After stirring for 30 minutes, the precipitate was filtered, washed thoroughly with warm water and the substituted support was calcined in air to 700° C.

TABLE I

| | Unsubstituted $TiO_2$ Anatase and Rutile Surface Areas and Stabilities | | |
|---|---|---|---|
| Composition | Temperature Calcination (°C.) | Phase | Area ($m^2$/gm) |
| $TiO_2$ | 430 | Anatase* | 120 |
| | 700 | Rutile | 2 |

*Initially precipitated phase

Table I compares the surface areas and stabilities of unsubstituted anatase polymorph, prepared as described in Example 1. The results show an anatase surface area that after a 430° C. calcination measuring 120 $m^2$/gm, but following an overnight calcination at 700° C. it completely converts to the rutile polymorph having a lower surface area of 2 $m^2$/gm.

Table I illustrates that the rutile polymorph has a substantially decreased surface area. By maintaining the anatase polymorph with its increased surface area, the dispersability of cobalt is enhanced, thereby affording increased catalyst activity.

TABLE II

| | Zirconium Substituted Titanias: Phase Stabilities and Surface Areas | | |
|---|---|---|---|
| Composition | Temperature Calcination (°C.) | Phase | Area ($m^2$/gm) |
| $Ti_{.97}Zr_{.03}O_2$ | 700 | Anatase | 36 |
| $Ti_{.86}Zr_{.14}O_2$ | 700 | Anatase | 56 |

Zirconium substituted into anatase at 3 and 14 mole percents as described in example 3 is shown in Table 2. As the table indicates, the substitution of 3 gram atom percent of zirconium (x=0.03) stabilizes the anatase polymorph precluding transformation into rutile following a 700° C. calcination. With higher zirconium substitutions, the stabilizing influence increases. With increasing zirconium substitution (i.e., for $Ti_{0.86}Zr_{0.14}O_2$) the surface area increases to 56 $m^2$/gm following 700° C. calcination.

TABLE III

| | Silicon Substituted Titanias: Phase Stabilities and Surface Areas | | |
|---|---|---|---|
| Composition | Temperature Calcination (°C.) | Phase | Area ($m^2$/gm) |
| $Ti_{.99}Si_{.01}O_2$ | 700 | Anatase | 52 |
| $Ti_{.97}Si_{.03}O_2$ | 700 | Anatase | 76 |
| $Ti_{.95}Si_{.05}O_2$ | 700 | Anatase | 119 |
| $Ti_{.86}Si_{.14}O_2$ | 700 | Anatase | 133 |

Table III shows the effect of silicon substitution into anatase. The samples are descibed in Example 2. With silicon substitution, anatase resists transformation to rutile at 700° C. even at a 1% gm atom level. Silicon substitution also enhances the surface area of anatase. With 1 gm, 3 gm, 5 gm, and 14% substitution, the surface area stabilizes at 52 $m^2$/gm, 76 $m^2$/gm, 119 $m^2$/gm and 133 $m^2$/gm respectively.

TABLE IV

| | Tantalum Substituted Titania: Phase Stabilities and Surface Areas | | |
|---|---|---|---|
| Composition | Temperature Calcination (°C.) | Phase | Area ($m^2$/gm) |
| $Ti_{.86}Ta_{.14}O_2$ | 700 | Anatase | 71 |

Table III shows the effect of tantalum substitution into anatase. The sample is described in Example 4. With tantalum substitution at the 0.14 mole % level, anatase resists transformation to rutile at 700° C.

EXAMPLE 4

Analysis of Temperature Stability

A very thin layer of a powdered catalyst containing cobalt, produced according to the method described in Example 1 and Example 2, was sprinkled across the surface of a 1 centimeter wide strip of Pt which served as both a holder and a resistance heater. The sample holder was mounted in a gas-tight housing where only the sample and the holder were heated. Temperatures were measured using a thermocouple (Pt—Pt/10% Rh) welded to the underside of the center of the heating element. The temperature indicator was calibrated using known phase changes for inorganic materials and was within 3° C. of the reported phase change temperature for these materials. The samples were examined at room temperature, sampled again at 350° C. and then at increments of 50° C. up to 950° C. and finally cooled to room temperature.

The X-ray diffractograms were acquired on a Phillips APD 3600 Automated X-ray Powder Diffractometer (Philips Electronics Instruments, Inc., Mahway, N.J.). The diffractometer uses Cu $K\alpha_1$ radiation ($\lambda = 1.5418$ Å) at 45 kV and 40 ma and is equipped with a graphite monochromator, theta-compensating slit, scintillation counter and pulse-height analyzer. Wide angle x-ray diffraction spectra were collected.

The diffractogram at room temperature showed no second phase, with small shifts in the reflection peaks of the anatase structure indicating that the silicon was incorporated into the titania anatase polymorph. Surface areas were measured by a multipoint BET $N_2$ adsorption method.

High temperature x-rays were measured with a Model HTK-10 High-Temperature attachment, (manufactured by Anton Parr, KG Kartnerstrasse 322, a-8054, Graz, Austria) which was attached to the tube tower of a Phillips XRG-3000 x-ray generator interfaced with a Philips APD 3600 Data System. The generator was equipped with a graphite monochromator and a theta-compensating slit. The x-ray data was obtained using Cu $K\alpha$ radiation at 45 kV, 40 mA and the samples were scanned at 1°/min over $2\theta$ alfa range of interest for selected peaks.

The results of the analysis are shown in FIG. 1. The anatase polymorph bulk substituted with Si was stable up to at least 700° C. to 750° C. The complete conversion to rutile did not occur until 950° C. The silicon substituted anatase differed from unsubstituted samples where the anatase to rutile polymorph conversion occured rapidly at 650° C. -700° C. and was virtually complete at 800° C. Also, with the anatase polymorph bulk substituted with Si, the cobalt titanate ($CoTiO_3$) formation is retarded occuring at higher temperatures (700°–750° C.) as compared to unsubstituted samples (600°–650° C.). Retardation of the formation of bulk $CoTiO_3$ facilitates regenerability of the cobalt catalyst during Fischer-Tropsch synthesis by allowing oxidation of the carbonaceous deposits without forming a difficult to reduce cobalt phase.

What is claimed is:

1. In a Fischer-Tropsch process, under Fischer-Tropsch reaction conditions, including contacting with a feedstream comprising a CO and $H_2$ reaction mixture, a 400°–750° C. regeneration stable catalyst composition comprising cobalt on a substituted ternary metal oxide of titania having the general formula $Co/Ti_{1-x}M_xO_2$ wherein x is from 0.01 to 0.14 and M is selected from the group consisting of silicon, zirconium, and tantalum, wherein the titania is an anatase polymorph.

* * * * *